United States Patent [19]

Ellens

[11] Patent Number: 4,852,723
[45] Date of Patent: Aug. 1, 1989

[54] GUARD FOR CONVEYOR TURNS

[75] Inventor: Daniel S. Ellens, Brighton, Mich.

[73] Assignee: Jervis B. Webb Company, Farmington Hills, Mich.

[21] Appl. No.: 186,356

[22] Filed: Apr. 26, 1988

[51] Int. Cl.4 ............................................. B65G 21/00
[52] U.S. Cl. ................................. 198/860.5; 474/144
[58] Field of Search ............... 198/860.3, 860.5, 860.1, 198/729, 735, 834, 860.3, 860.5, 860.1, 861.1, 866; 474/144-147; 104/189

[56] References Cited

U.S. PATENT DOCUMENTS

| | | | |
|---|---|---|---|
| 633,534 | 9/1899 | Read | 474/147 X |
| 1,432,098 | 10/1922 | Benedict | 474/147 |
| 2,652,808 | 9/1953 | Wagner | 198/735 X |
| 2,764,276 | 9/1956 | Ruppe | 198/860.3 X |
| 3,147,853 | 9/1964 | Van Huis | 198/729 |
| 3,885,471 | 5/1975 | Morine et al. | 474/144 |
| 3,965,766 | 6/1976 | Luenberger | 474/146 X |
| 4,250,989 | 2/1981 | Gründren et al. | 198/729 |
| 4,512,459 | 4/1985 | Kerklies | 198/729 |
| 4,609,365 | 9/1986 | Eberle | 474/144 X |

Primary Examiner—Robert J. Spar
Assistant Examiner—D. Glenn Dayoan
Attorney, Agent, or Firm—Joseph W. Farley

[57] ABSTRACT

A guard for enclosing the sprocket, trolley and chain elements of a conveyor at a sprocket wheel turn, comprises a circular cover portion having a diameter greater than that of the sprocket and a skirt extending generally perpendicularly from the entire circumferential edge of the cover portion. Portions of the skirt are severable therefrom at locations defined by the ends of the arc of the turn at which the guard is mounted to provide passages for the conveyor chain through the skirt and into engagement with the sprocket.

6 Claims, 2 Drawing Sheets

GUARD FOR CONVEYOR TURNS

SUMMARY OF THE INVENTION

This invention relates to an improved guard for the enclosure of turns in a conventional endless chain conveyor having a track, trolleys supported by the track and an endless chain connected to the trolleys.

The guard of the invention is particularly applicable to turns formed by a curved section in the track and at which the chain is guided by engagement with the periphery of a rotatable circular member such as a sprocket through an arc of a desired length. Such turns are commonly referred to as "sprocket wheel turns". The arc of the turn may extend through any desired number of degrees, for example, 45°, 90°, 180° etc. Turn guards have conventionally been fabricated as required to fit a particular sprocket wheel size and turn arc.

The present invention provides a sprocket turn guard of standardized construction for a given diameter of sprocket wheel. This guard can readily be used with any arc of turn and forms a complete enclosure for the moving sprocket, trolley and chain elements of the conveyor at the turn.

The guard of the invention comprises a circular cover portion having a circumferential edge whose diameter is greater than that of the sprocket wheel or rotatable circular member, and having a skirt portion. The skirt portion extends from the entire circumferential edge of the cover portion in generally perpendicular relation therewith. Mounting means are provided for positioning the guard in superimposed enclosing relation with the sprocket wheel and with the skirt portion of the guard extending generally parallel to the axis of rotation of the sprocket wheel. Portions of the skirt portion are serverable therefrom at locations defined by ends of the arc of the turn at which the guard is positioned to provide passages for the chain through the skirt portion and into engagement with the enclosed sprocket wheel.

Preferably, the mounting means includes a right angular flange formed around the extending end of the skirt portion, the flange projecting outwardly from and parallel to the skirt portion and being adapted to engage the conveyor track at a turn.

The guard is preferably formed as a unitary member from a material such as high density polyethylene with suitable stiffening ribs. Portions of the skirt of such a guard can readily be cut away or severed when the guard is installed at a turn to provide the passages for the conveyor chain.

DETAILED DESCRIPTION

Figure 1:
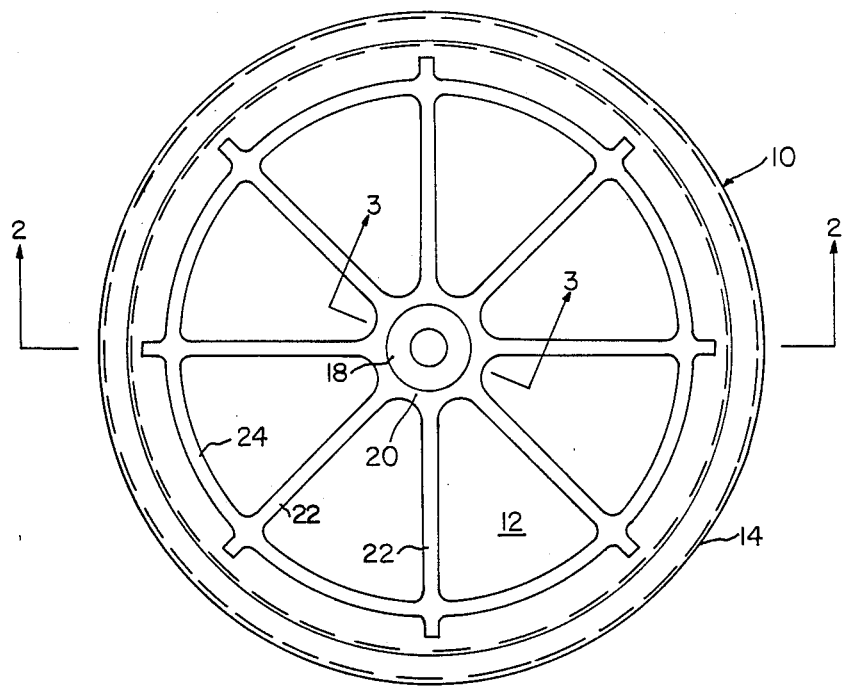
FIG. 1 is a plan view of a guard of the invention.
Figure 2:
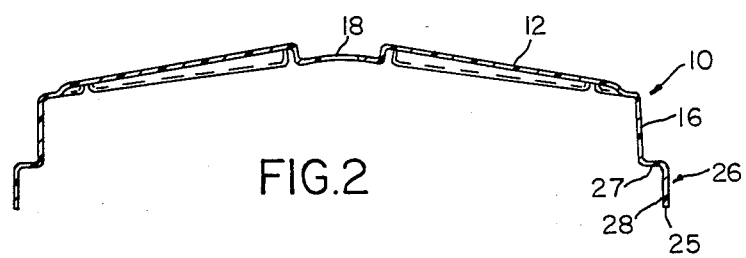
FIG. 2 is a sectional elevation taken as indicated by the line 2—2 of FIG. 1.
Figure 3:
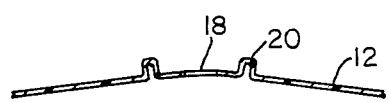
FIG. 3 is a sectional detail taken as indicated by the line 3—3 of FIG. 1.

With reference to FIGS. 1-3, a guard 10 comprises a circular cover portion 12 having a circumferential edge 14. A skirt portion 16 is formed integrally with the cover portion 12 and extends from the entire circumferential edge 14 in generally perpendicular relation to the cover portion 12. However, the angular relation between the cover and skirt portions may be slightly obtuse to form a dished sectional configuration, as shown in FIG. 2.

The guard 10 is preferably molded from a suitable plastic material such as high density polyethylene to form a unitary member. The cover portion is rigidified by a central recess 18 bordered by a circular rib 20 from which extend a series of radial ribs 22 joined by an outer circular rib 24. Formed around the extending end 25 of the skirt portion 16 is a circumferential right angular flange 26 and having portions 27 and 28 which respectively extend outwardly from and parallel to the skirt portion 16.

Figure 4:
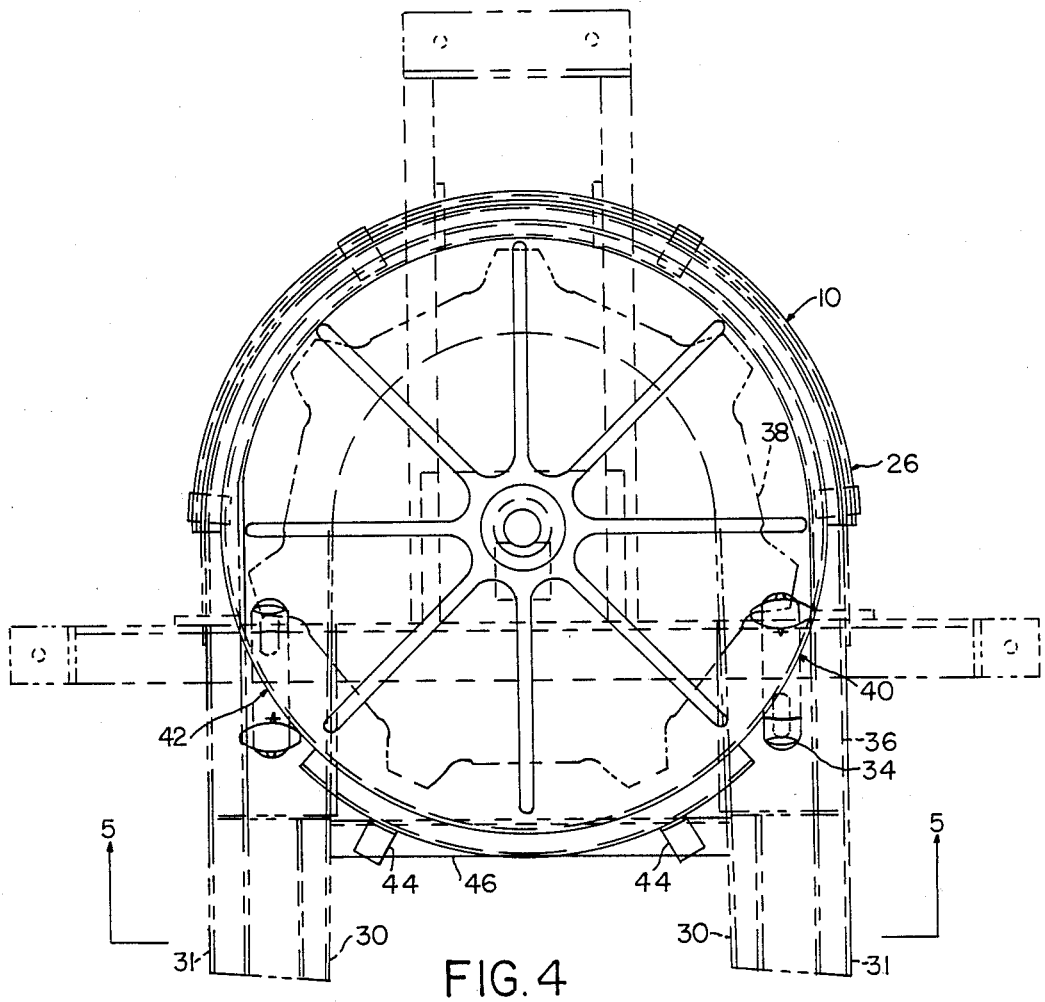
FIG. 4 is a plan view showing a typical installation of the guard of the invention at a conveyor sprocket wheel turn of 180°.
Figure 5:
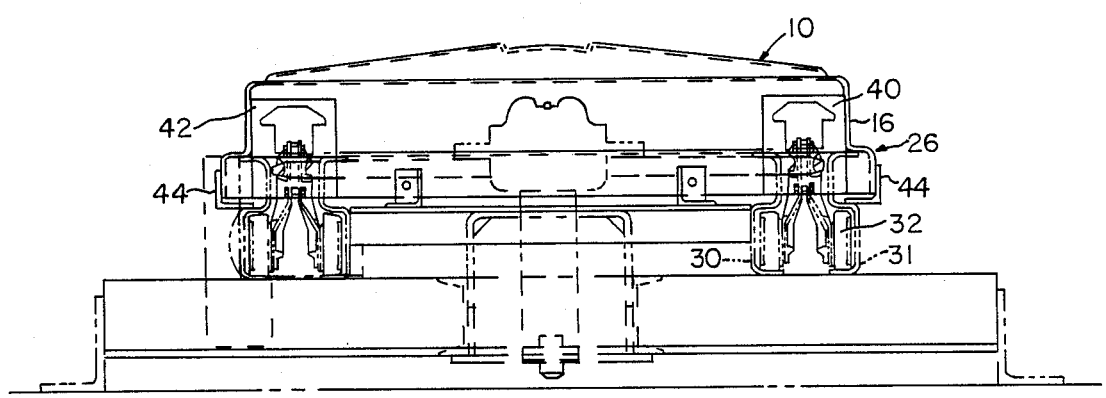
FIG. 5 is an elevation taken as indicated by the arrows 5—5 of FIG. 4.

FIGS. 4 and 5 illustrate a typical installation of the guard 10 at a 180° turn in a conveyor which includes a track formed by inner and outer track members 30 and 31, trolleys 32 supported on the track, and an endless chain 34 connected to the trolleys 32. At the turn, the inner track member terminates, the outer track member extends in a 180° curved section 36, and the chain is guided and supported by engagement with the periphery of a rotatable circular member or sprocket 38.

Mounting means position the guard 10 in superimposed enclosing relation with the sprocket 38 and with the conveyor chain components travelling around the sprocket through the turn. Prior to this positioning of the guard 10, parts of the skirt portion 16 are cut away or severed from the guard to provide passages 40 and 42 for the travel of the conveyor 34 into and out of engagement with the sprocket 38 at the ends of the 180° arc of the turn. The skirt portion 16 is severable by a cutting operation so that the passages 40 and 42 can be provided at the ends of any length of arc normally employed in endless chain trolley conveyors.

In the installation shown in FIGS. 4 and 5, the mounting means for positioning the guard 10 include its flange 26 which rests on the outer track member 31 and which is fastened to angle clips 44 secured to the outer track member 31 and to a support member 46 extending transversely between the inner track members 30. The guard 10 thus provides a complete enclosure, in combination with the track members 30 and 31, for all the moving parts at a sprocket wheel turn in the conveyor.

I claim:

1. A guard for a turn in a conveyor having a track, trolleys supported by the track, and an endless chain connected to the trolleys in vertically spaced relation therewith, said turn including a curved section in the track at which the chain is guided by engagement with the periphery of a rotatable circular member through an arc of a desired length, said guard comprising:

a circular cover portion having a circumferential edge whose diameter is greater than the diameter of said rotatable member, and a skirt formed integrally with said cover portion, said skirt extending from said circumferential edge in generally perpendicular relation to said cover portion;

and mounting means for positioning said guard in superimposed enclosing relation with said rotatable member, portions of said skirt being severable from said guard at spaced locations defined by the ends of said arc, said severable portions providing passages for said chain through said skirt into and out of said engagement with said rotatable member whereby said guard is adapted for use with turns of different arcuate length.

2. A guard according to claim 1 wherein said skirt extends to a right angular flange formed thereon and projecting outwardly from and parallel thereto.

3. A guard according to claim 1 wherein said cover portion is provided with a series of reinforcing ribs extending radially toward said circumferential edge.

4. A guard according to claim 3 wherein said radially extending reinforcing ribs are joined by a circular rib disposed adjacent to said circumferential edge.

5. A guard according to claim 1 wherein said mounting means includes means for attaching said skirt to said conveyor track.

6. A guard according to claim 2 wherein said mounting means includes means for attaching said flange of said skirt to said conveyor track.

* * * * *